(12) United States Patent
Ottesen et al.

(10) Patent No.: US 6,417,982 B1
(45) Date of Patent: Jul. 9, 2002

(54) SYSTEM AND METHOD FOR IDENTIFYING AND FILTERING A HEAD SUSPENSION ASSEMBLY RESONANCE FREQUENCY

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,131

(22) Filed: Dec. 2, 1998

(51) Int. Cl.$^7$ ............................................. G11B 5/596
(52) U.S. Cl. ..................................................... 360/77.02
(58) Field of Search ................................ 360/77.02, 75, 360/78.09, 78.12, 29, 39, 73.03; 318/560–562; 364/484, 160, 176; 369/44.28–44.32

(56) References Cited

U.S. PATENT DOCUMENTS

| | | | |
|---|---|---|---|
| 4,942,609 A | | 7/1990 | Meyer |
| 5,377,096 A | * | 12/1994 | Ono ........................... 364/176 |
| 5,459,383 A | * | 10/1995 | Sidman et al. .............. 318/611 |
| 5,510,939 A | * | 4/1996 | Lewis ....................... 360/78.09 |
| 5,583,784 A | * | 12/1996 | Kapust et al. .............. 364/484 |
| 5,661,615 A | * | 8/1997 | Waught et al. ................ 360/75 |
| 5,870,242 A | * | 2/1999 | Abe et al. ............. 360/78.09 X |
| 5,909,661 A | * | 6/1999 | Abramovitch et al. ... 360/77.04 X |
| 5,920,441 A | * | 7/1999 | Cunningham et al. ... 360/78.05 |
| 5,978,752 A | * | 11/1999 | Morris ................ 360/78.09 X |

FOREIGN PATENT DOCUMENTS

| EP | 0 554 125 A2 | 1/1993 |
|---|---|---|
| WO | 00/00966 | 1/2000 |

OTHER PUBLICATIONS

R. Palmer, Automatic notch frequency control for servo stabilization, IBM–TDB, vol. 19 No. 10, pp. 3860–3862, Mar. 1977.*

* cited by examiner

Primary Examiner—David Hudspeth
Assistant Examiner—K. Wong
(74) Attorney, Agent, or Firm—Mark A. Hillingsworth

(57) ABSTRACT

A method and apparatus for identifying and filtering a resonance frequency of a support structure supporting a read/write head in proximity with a data storage medium involves obtaining a particular sample of a position error signal (PES) frequency transform, preferably using Goertzel's algorithm. The velocity of the data storage medium is varied, and the magnitude of a particular PES frequency transform sample is computed at each of the velocities. A resonance frequency of the support structure is calculated using the velocity associated with the particular sample having a maximum magnitude. The effects of one or more resonance frequencies associated with a read/write head suspension may be canceled in a position error signal using one or more programmable filters provided in each servo loop. A processor programs the filters using the calculated resonance frequencies and adjusts to compensate for the additional lag introduced into the respective servo loops by the selected programmable filters. A method and apparatus for identifying one or more resonance frequencies of one or more read/write head support structures according to the principles of the present invention may be implemented in a data storage system and, preferably, implemented in-situ a data storage system without resort to circuitry external to the data storage system.

30 Claims, 8 Drawing Sheets

SYSTEM AND METHOD FOR IDENTIFYING AND FILTERING A HEAD SUSPENSION ASSEMBLY RESONANCE FREQUENCY

FIELD OF THE INVENTION

The present invention relates generally to data storage systems and, more particularly, to a system and method for identifying and filtering a frequency associated with undesirable resonance in a mechanical support assembly for a read/write head.

BACKGROUND OF THE INVENTION

It is well understood in the disk drive system manufacturing community that mechanical head/suspension/arm (HSA) assembly resonances create problems of varying severity during proper servo tracking operations in a disk drive system. These undesirable mechanical resonances are typically identified during manufacturing and screening by performing frequency analysis of the position error signal (PES) of each individual read/write head. The variations in similar suspension resonance frequencies between different HSA assemblies can be substantial. For example, it is not uncommon to observe more than a +/−200 Hz frequency variation in bending and torsional modes between suspensions in a single disk drive system. It is also not uncommon for a disk drive system to have upwards to 20 or more HSA assemblies.

A significant difficulty associated with addressing unwanted mechanical HSA assembly resonances within the disk drive servo loop is the present inability to precisely identify undesirable resonance frequencies derived from PES measurements. One reason for this present inability is the limited servo sampling rate associated with typical disk drive systems. For example, a given disk drive system may employ 90 servo sectors for each of a number of disks spinning at 7,200 revolutions per minute (RPM). Such a disk drive system will have a servo sampling rate of. 90·7,200/60=10.8 kHz, which provides for a low frequency resolution of 7,200/60=120 Hz. This relatively low frequency resolution of 120 Hz implies that an HSA assembly resonance can only be identified within an accuracy of +/−60 Hz. It will be appreciated that future disk drive systems having disks spinning at 10,000 RPM or higher will demonstrate even poorer frequency resolution. For example, a disk drive system employing a data storage disk having 80 servo sectors per revolution and spinning at 10,000 RPM will have a frequency resolution of only 166.7 Hz.

There exists a need for a system and method for identifying frequencies of bothersome mechanical HSA assembly resonances occurring in a data storage system with a high degree of precision. There exists a further need for a system and method for adaptively filtering such bothersome mechanical HSA assembly resonances with a high degree of effectiveness. The present invention fulfills these and other needs.

SUMMARY OF THE INVENTION

The present invention is directed to a method and apparatus for identifying and filtering a resonance frequency of a support structure supporting a read/write head in proximity with a data storage medium. A position error signal is produced using servo information provided on a data storage medium, and a particular sample of a frequency transform of the position error signal is obtained. A magnitude of the particular sample is computed, preferably using Goertzel's algorithm. The velocity of the data storage medium is varied, and the magnitude of a particular PES frequency transform sample is computed at each of the velocities. A resonance frequency of the support structure is calculated using the velocity associated with the particular sample having a maximum magnitude.

The frequency transform of the position error signal may be produced using one of several frequency transform techniques, including a Discrete Fourier Transform (DFT), Fast Fourier Transform (FFT), a Short-Time Discrete Fourier Transform (STFT), or a wavelet transform technique. Obtaining the particular sample of a PES frequency transform in accordance with one embodiment involves obtaining a PES frequency transform sample which is representative of a frequency higher than the resonance frequency of the support structure. The velocity of the data storage medium is reduced during the resonance frequency identification process according to this embodiment.

In accordance with another embodiment, obtaining the particular sample involves obtaining a PES frequency transform sample which is representative of a frequency lower than the resonance frequency of the support structure. The velocity of the data storage medium is increased during the resonance frequency identification process according to this embodiment.

Another aspect of the present invention concerns canceling the effect of one or more resonance frequencies associated with a read/write head suspension in a position error signal. In accordance with one embodiment, one or more transducers supported on respective support structures are situated in proximity with the data storage medium. Each of the transducers are defined within a respective servo loop. A position error signal is produced within each of the servo loops using a respective one of the transducers. One or more programmable filters are provided within each of the servo loops. A processor programs selected ones of the programmable filters to substantially cancel an effect of one or more resonance frequencies associated with each of the support structures in the respective position error signals.

In a further aspect of the present invention, each of the selected programmable filters adds lag into its respective servo loop, and the processor adjusts to compensate for this additional lag. The processor may, for example, compensate for the additional lag by adding lead into the respective servo loops. The processor may comprise a Proportional-Integral-Differential (PID) controller, and the programmable filters may comprise programmable notch filters or programmable elliptic filters.

A method and apparatus for identifying a resonance frequency of a read/write head support structure according to the principles of the present invention may be implemented in a data storage system and, preferably, implemented in-situ a data storage system without resort to circuitry external to the data storage system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
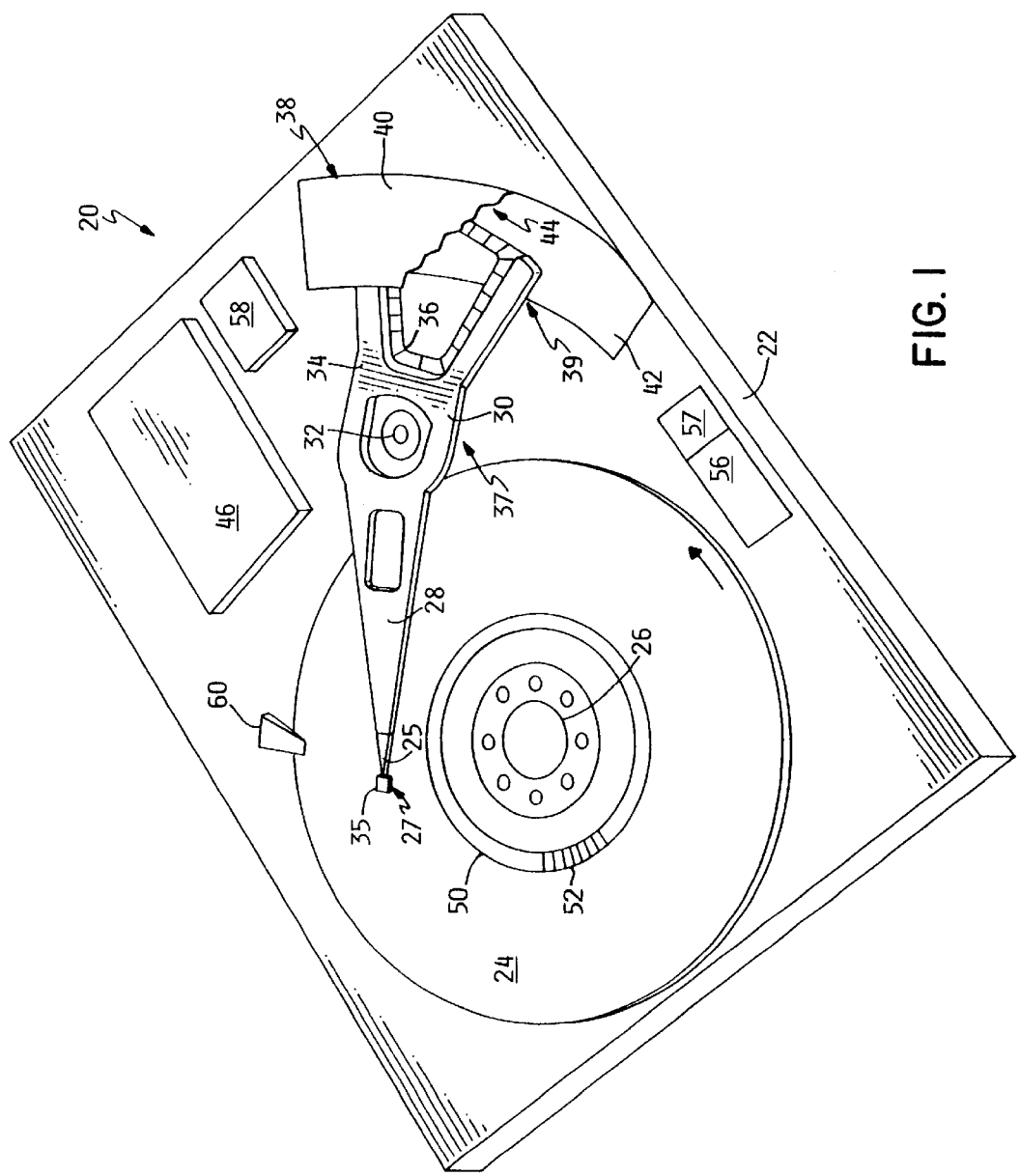
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The adaptive filtering system and method of the present invention is preferably employed in a disk drive system for purposes of precisely identifying frequencies of undesirable resonances in the mechanical head/suspension/arm (HSA) assembly of the disk drive system. The system and method of the present invention may be further employed to cancel the effects of undesirable resonance frequencies on the servo positioning system for each HSA assembly of a disk drive system. Canceling the effects of bothersome HSA assembly resonances on the servo positioning system is preferably accomplished through adaptive tuning of one or more digital notch filters provided within each of the HSA servo control loops. Cancellation of the effects of such bothersome mechanical HSA assembly resonance frequencies in the disk drive system improves servo tracking performance, data reliability, and increases potential track densities of data storage disks employed in hard disk drive systems.

Figure 2:
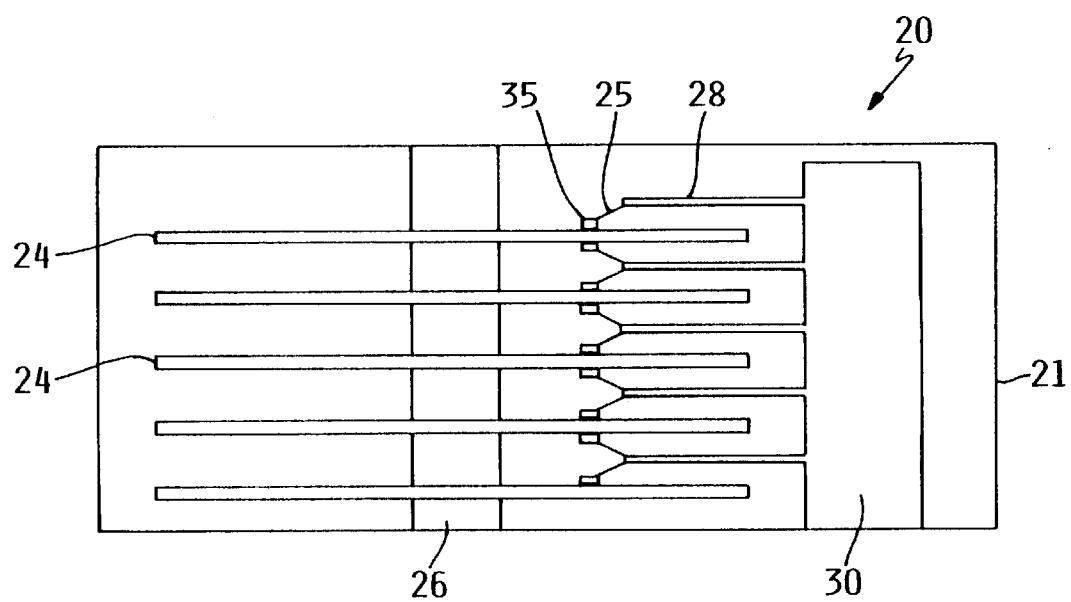
FIG. 2 is a side plan view of a disk drive system comprising a plurality of data storage disks.

Referring to the drawings, and more particularly to FIGS. 1 and 2, there is illustrated a data storage system 20 within which the head suspension resonance estimation and compensation methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation. As is depicted in FIG. 1, each disk 24 is typically formatted to include a plurality of spaced concentric tracks 50. One or more of the disks 24 may alternatively be formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

A typical disk drive system employs several data storage disks, such as ten disks for example, for purposes of storing digital data. Given this configuration, such a disk drive system will typically include 20 read/write heads and 20 HSA assemblies. Each of the read/write heads is part of a respective servo loop, which provides for a total of 20 servo loops in this illustrative example. If each disk is formatted to included 90 servo sectors per revolution, then 90 position error signals are produced within each of the 20 servo loops per disk revolution.

In order to reduce the computational load on the servo processor, it is possible to select only one DFT sample from the 90 DFT samples developed within each of the 20 servo loops per disk revolution for purposes of identifying one or more resonance frequencies associated with each of the 20 HSA assemblies. The little-known Goertzel's algorithm may be applied to compute this single DFT frequency sample. As will be discussed hereinbelow, undesirable frequencies associated with HSA assembly resonance, once identified, may be virtually eliminated from the position error signal of each of the 20 servo loops by implementing a filtering methodology in accordance with the principles of the present invention.

Figure 3:
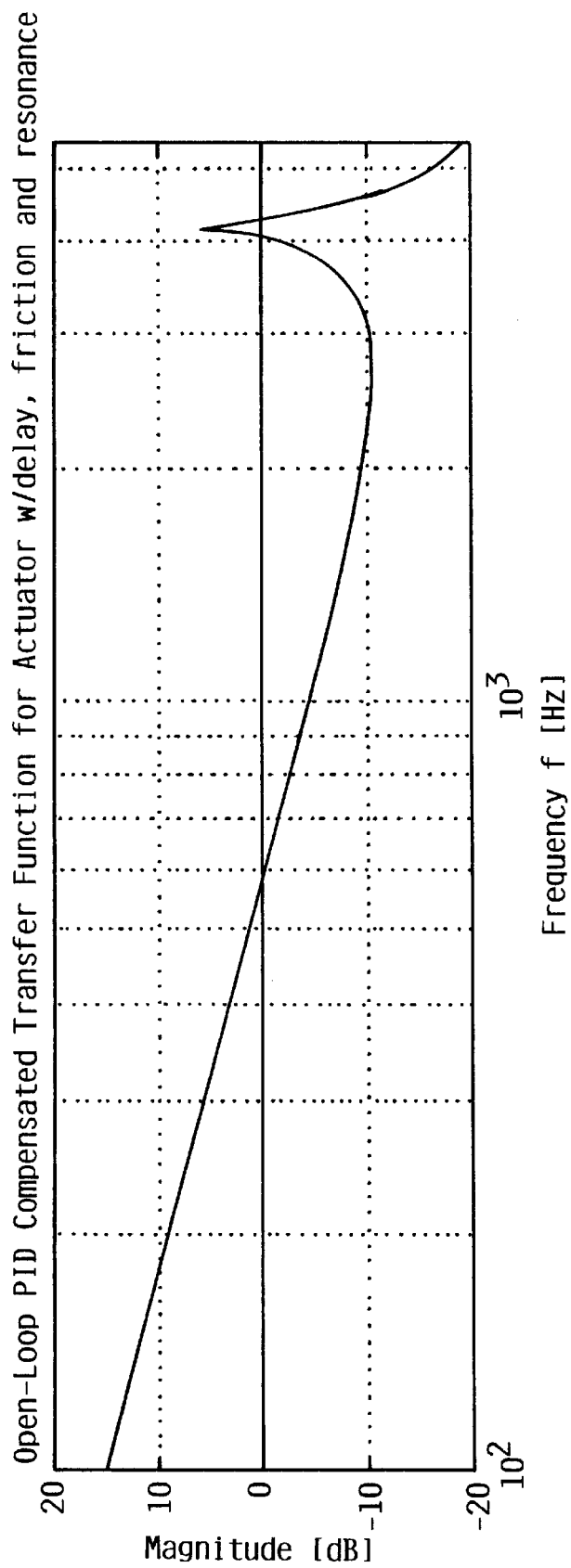
FIG. 3 is a graphical illustration of the magnitude of suspension resonance shown in the frequency magnitude response of a simulated open-loop PID (Proportional-Integral-Derivative) compensated actuator transfer function, with simulated Discrete Fourier Transform (DFT) frequency samples shown superimposed on the transfer function magnitude response.
Figure 4:
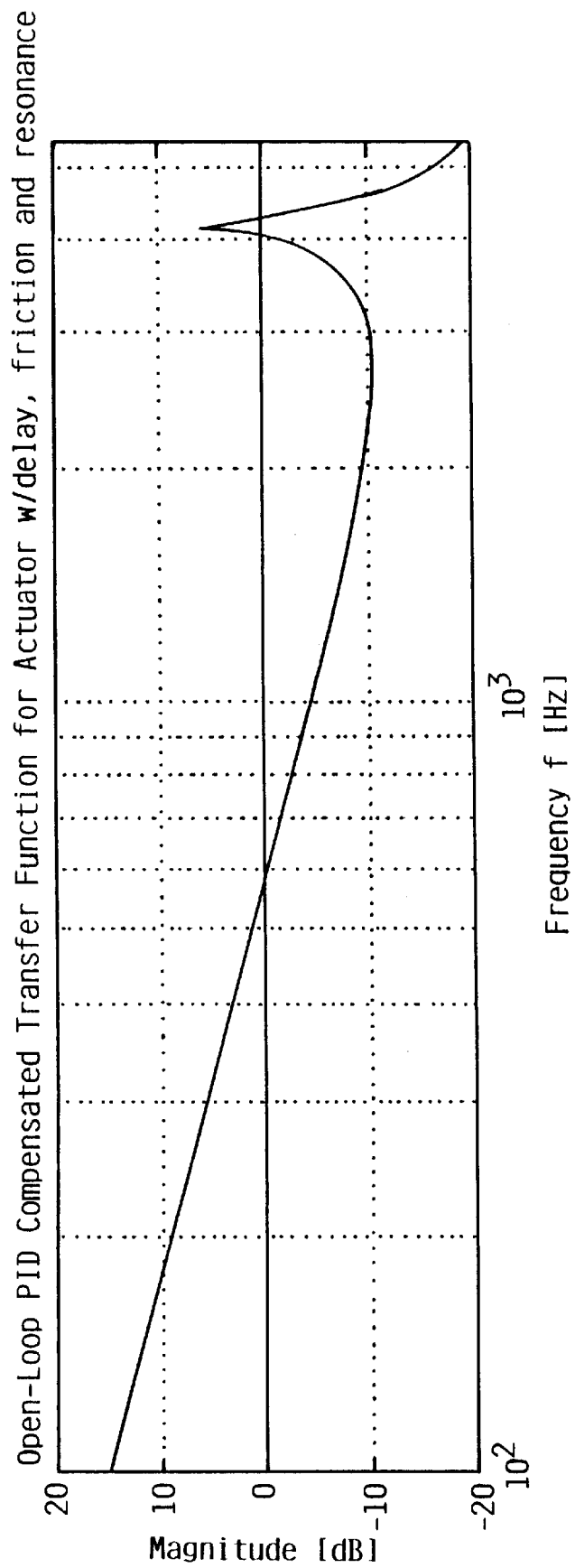
FIG. 4 illustrates the result of shifting a DFT sample in the neighborhood of the apex of the resonance peak to be in alignment with the resonance peak apex in accordance with the principles of the present invention.

As was previously mentioned in the Background, mechanical HSA assembly resonances cause unique problems during proper servo tracking in a disk drive system. The problem of precisely identifying bothersome mechanical HSA assembly resonance frequencies derived from PES measurements will now be discussed with reference to FIGS. 3 and 4. FIG. 3 is an illustration of a simulated PID (Proportional-Integral-Derivative) compensated actuator open-loop transfer function for a disk drive system. FIG. 3 illustrates the location of a number of DFT frequency samples computed using the position error signal derived from a data storage disk having 90 servo samples per revolution and spinning at 7,200 RPM. FIG. 4 illustrates the location of DFT frequency samples computed using the position error signal obtained from a data storage disk having 90 servo samples per revolution and spinning at 7,097 RPM in accordance with an embodiment of the present invention.

In FIG. 3, the magnitude of the suspension resonance having a natural frequency at 4,140 Hz and a damping ratio of 0.02 is shown in the frequency magnitude response of the simulated open-loop PID compensated actuator transfer function, GH(z). Superimposed on the transfer function magnitude response are simulated Discrete Fourier Transform (DFT) frequency samples, which are shown as dots, obtained from a disk drive system having a servo sampling rate of 10.8 kHz and a frequency resolution of 120 Hz. It can be seen from FIG. 3 that none of the dots (i.e., DFT frequency samples) fall directly on the apex of the resonance peak.

The closest dot to the apex of the resonance peak located at 4,140 Hz is the $34^{th}$ frequency sample at 34·120 Hz=4,080 Hz. The second closest dot to the apex of the resonance peak located at 4,140 Hz is the $35^{th}$ frequency sample at 35·120= 4,200 Hz. FIG. 3 clearly illustrates the problem of precisely identifying the frequency of HSA assembly resonance due to the limited servo sampling rate inherent in typical disk drive system configurations. It will be appreciated that future disk drive systems having disks spinning at 10,000 RPM or higher will demonstrate even poorer frequency resolution. For example, a disk drive spinning at 10,000 RPM may have a frequency resolution of 166.7 Hz. For such a disk drive system employing 80 servo sectors, the $24^{th}$ frequency sample would fall at 4,000 Hz, and the $25^{th}$ frequency sample would fall at 4,167 Hz.

In accordance with an embodiment of the present invention, the rotational velocity of the data storage disk is varied in a manner which permits the identification of bothersome mechanical HSA assembly resonance frequencies with a high degree of precision. The velocity of disk is adjusted slightly, such as by effecting slight variations in the velocity of the spindle that rotates the disk, from a constant velocity. This adjustment in disk/spindle velocity results in a proportional shifting of all DFT sample frequencies. For example, the $35^{th}$ frequency sample described previously with respect to FIG. 3 would shift from 4,200 Hz to 4,083 Hz when the spindle velocity is reduced from 7,200 RPM to 7,000 RPM, which constitutes a 2.8% reduction in spindle velocity. The $35^{th}$ DFT sample may be shifted to be precisely located at the apex of the resonance peak shown in FIG. 3 by reducing the spindle velocity from 7,200 RPM to 7,097 RPM, which represents a 1.43% reduction in spindle velocity. The result of shifting the $35^{th}$ DFT sample to the apex of the resonance peak is depicted in FIG. 4.

In a similar manner, the spindle velocity could be increased, rather than decreased, such that the $34^{th}$ DFT sample is shifted to coincide with the 4,140 Hz resonance peak. However, it is believed that increasing the spindle velocity beyond the rated velocity disadvantageously increases power dissipation, and could also be detrimental to the spindle bearings over time. As such, it is preferred that spindle velocity be reduced slightly so as to cause the downshifting of a DFT sample adjacent a resonant peak, such that the downshifted DFT sample is in alignment with the frequency of the resonant peak.

In addition to the above-described difficulties, a further complication arises when attempting to determine HSA frequency response through DFT techniques using only on-board (i.e., in-situ) disk drive system computing facilities, such as the servo microprocessor. For example, if N=90, the DFT approach would require that a total of 3·90·90=24,300 complex operations be performed. It is noted that the time to perform one complex operation (e.g., multiplications and additions) is generally equal to the time required to perform two real operations. If, by way of further example, the Fast Fourier Transform (FFT) algorithm is employed, and if N=90, then a 128-point FFT is required (N=128) and the number of complex operations is given as $N \log_2 (N)=896$. In the case in which N=128, 38 zeros must be appended to the 90 PES samples in order to use the 128-point FFT. The FFT algorithm is useful if all frequency samples are needed, but is considered computationally insensitive if all N-sector PES samples are being used. It can be seen that a DFT approach would be 27 times more computationally insensitive than an FFT approach. In many servo and read/write channel applications, in contrast to other applications, only one or a few frequency samples are needed.

One approach to addressing the problem of limited on-board computational resources is employment of the little-known Goertzel's algorithm. Goertzel's algorithm is an elegant recursive approach to computing the DFT when only one or a few samples of the DFT are required. Use of Goertzel's algorithm is particularly attractive in in-situ applications since it consists almost entirely of real additions and multiplications. Only one complex multiplication and one complex addition are required per frequency sample. An approach employing Goertzel's algorithm does not require that N be a power of 2.

Referring to the previous illustrative example in which N=90, the number of real multiplication operations in the case of using Goertzel's algorithm would be given as 2(N+2)=184 and 4(N+1)=364 real additions, or a total of 548 real operations. This represents an appreciable reduction in real operations when compared with the equivalent 1,792 real operations that would be necessary to effect an FFT implementation. A reduction in the computational load by more than a factor of three is achievable by employment of Goertzel's algorithm. Overall, the use of Goertzel's algorithm can be very significant in terms of improved cost and performance in disk drive system applications. It is to be understood that the methodology described herein need not employ Goertzel's algorithm, but that Goertzel's algorithm may result in a significant reduction in the computational load when performing in-situ DFT operations in disk drive system applications.

A more detailed description of an embodiment of the present invention will now be described with reference to FIGS. 5–7. In accordance with this embodiment, the precise frequency location of a mechanical HSA assembly resonance is determined by effecting small incremental variations in spindle velocity and computing one unique frequency sample of the DFT of the position error signal. This information is used to tune one or more digital notch filters for each HSA servo loop, such as by recomputing the coefficients of the digital notch filter, to effect perfect attenuation (e.g., cancellation) of specific PES components caused by the mechanical HSA assembly resonance.

It has been determined by the inventors through experimentation with extremely complex HSA assembly resonances that a particular resonance will have a frequency and a damping ratio that change as a function of temperature and time. It is therefore necessary to recompute, in-situ a disk drive system, the notch filter coefficients for each HSA that provide for the best attenuation of these unwanted resonance frequencies in the PES signal. This is especially important during disk drive system warm-up. By way of example, a loose swage joint may significantly alter both the frequency and damping characteristics of a given HSA assembly. Disk air turbulence may further excite HSA assembly resonances to a greater extent at the outer diameter of the disk than at the inner diameter of the disk.

The introduction of one or more notch filters for a given HSA structure will generally change the gain margin and the phase margin of the servo loop. Further, the gain and phase characteristics of each of the HSA servo loops may change in response to temperature variations over time, for example. As such, the servo loop for each HSA assembly may be subject to returning on a repeated basis during disk drive system operation. The servo processor must generally compensate for changes in the gain and phase margin due to the selective use of notch filters in each of the HSA servo loops. A notch filter which is active in a particular servo loop typically introduces delay or lag into the servo loop. In an embodiment in which a PID controller is employed, the differential control of the PID controller would be skewed relative to the integral control so as to introduce an offsetting amount of lead into the HSA servo loops in which the notch filters are in active operation.

Figure 5:
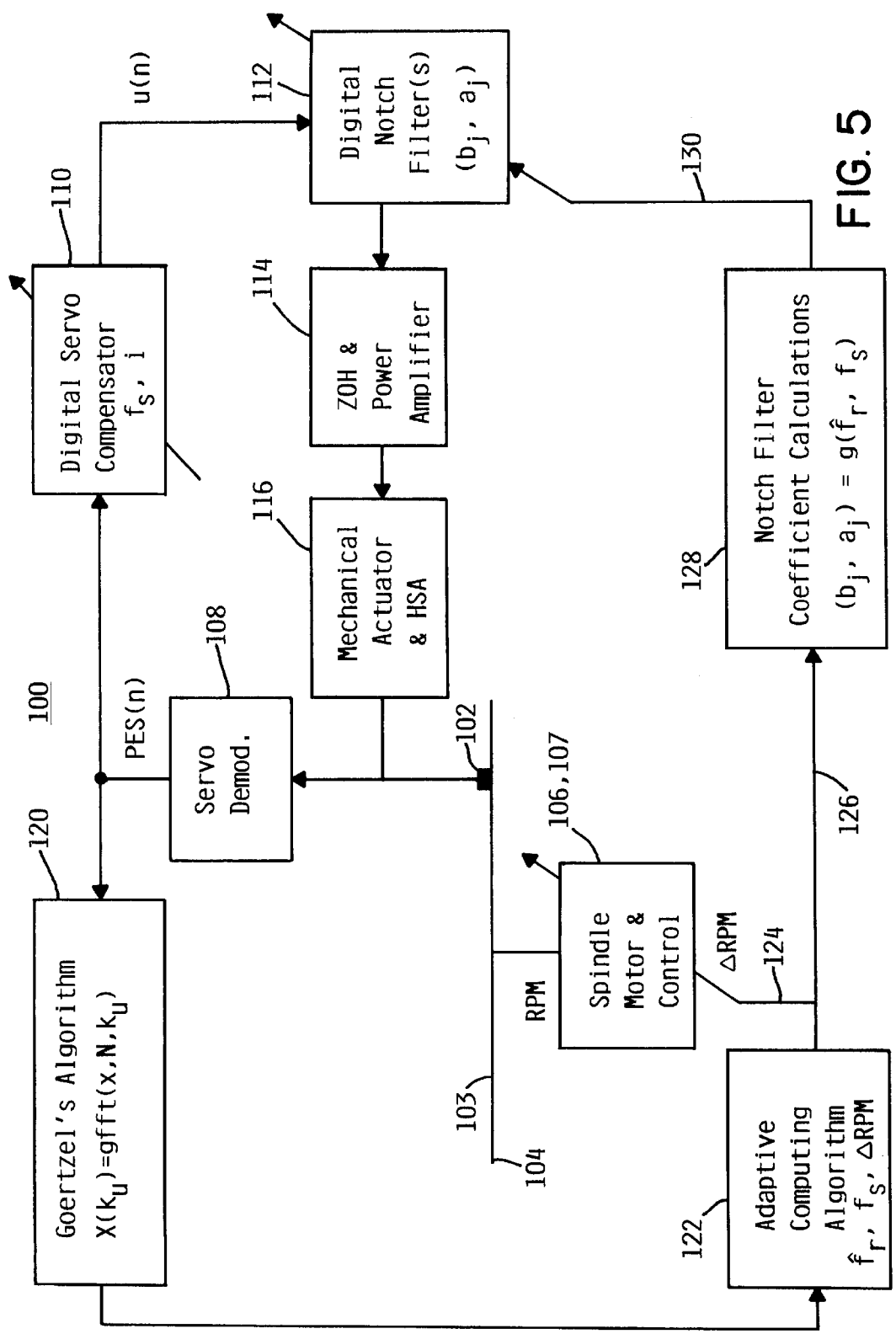
FIG. 5 is a block diagram of an embodiment of the present invention implemented in-situ a disk drive system environment.

Referring now to FIG. 5, there is illustrated a block diagram of one embodiment of the present invention implemented in-situ a disk drive system environment. The block diagram of FIG. 5 conceptually describes an embodiment of an on-board system 100 for adaptively filtering undesirable mechanical HSA assembly resonance. A recording head 102 is shown following a track of recorded information on the disk surface 103 of a data storage disk 104. Disk 104 is rotated by a spindle motor 106 under the control of a velocity control 107. The disk surface 103 includes pre-recorded servo patterns from which PES information is obtained via a servo demodulator 108. The mechanical actuator and HSA 116 is under closed-loop servo control. The closed servo loop for following a track of recorded information includes the servo demodulator 108, a digital servo compensator 110, one or more digital notch filters 112, a Zero-Order-Hold (ZOH) and power amplifier 114, and the moving mechanical actuator and HSA assembly 116.

A $k_u$-th DFT frequency sample, $x(k_u)$, is obtained using Goertzel's algorithm in block 120. The DFT frequency sample, $x(k_u)$, is processed by an adaptive computing algorithm (ACA) in block 122. A process-flow diagram of the adaptive computer algorithm implemented in block 122 in accordance with an embodiment of the present invention is depicted in FIG. 6, the details of which will be described later hereinbelow. In general, the adaptive computing algorithm computes an incremental spindle velocity change, ΔRPM, as a signal on line 124. The adaptive computing algorithm further provides signals representative of the recomputed sampling rate, $f_s$, and the estimated resonance frequency, $f_r$, on line 124.

As discussed previously, a change in the spindle velocity, which is given in terms of RPM, causes a change in the sampling rate, $f_s$, of the position error signal. The sampling rate, $f_s$, and the sampling period, $T_s$, may be expressed as:

$$f_s = N \cdot RPM/60 \quad [1]$$

$$T_s = 1/f_s \quad [2]$$

where, N represents the number of PES samples per revolution. The estimated resonance frequency, $f_r$, may be expressed as:

$$f_r = (\text{RPM} + \text{RPM}) \cdot k_u / 60 \quad [3]$$

During the estimation process performed for each of the resonance frequencies for each HSA assembly, the notch filters in block 112 are deactivated. The notch filters may be deactivated by setting the filter coefficient $b_0=1$ in Equation [5] below, and setting all other coefficients to zero. After a specific resonance frequency, $f_r$, is estimated, the corresponding notch filter is activated with the appropriate coefficients. The process may then proceed to another resonance in the same HSA structure using the previously activated notch filter in the servo loop. When the next resonance frequency is identified, another notch filter is activated in the servo loop. This process for determining one or more resonance frequencies in each of the HSA structures, and configuring associated notch filters in the servo loop, is repeated. The estimated tuned notch filter coefficients $[b_j, a_j]$ are computed in block 128 and provided to the notch filter algorithm in block 112 via line 130.

It is reemphasized that there may be more than one notch filter in block 112 associated with each HSA. If there are several bothersome HSA assembly resonances, then more than one Butterworth or Chebyshev notch filters may be required. Instead of using several cascaded $2^{nd}$ order notch filters, it may be desirable to use one $4^{th}$ order elliptic notch filter that effectively offers a very wide notch, such as notch defined from 2 kHz to 5 kHz in the example used with respect to FIGS. 3 and 4.

In general, the digital algorithms implemented by on-board adaptive filtering system 100 are functions of the sampling rate, $f_s$. The coefficients of the algorithm controlling the digital servo compensator 110 must therefore be subject to change in response to a change in the sampling frequency, $f_s$. For example, if the servo compensator 110 was implemented as a PID controller, then the transfer function, $C(z)$, is given as:

$$C(z) = K_p \left[ 1 + \frac{z}{f_s T_i(z-1)} + \frac{f_s T_d(z-1)}{z} \right] \quad [4]$$

where, $K_p$, $T_i$, $T_d$ represent proportional gain, integral time, and derivative time, respectively. Typically, the parameters $K_p$, $T_i$, and $T_d$ are tuned in accordance with the known Ziegler-Nichols tuning rule. It is noted that because the transfer function, $C(z)$, is a simple function of the sampling rate, $f_s$, the value of $C(z)$ may be easily recomputed.

In general, the dynamic response of the servo compensator 110 is a function of the number and frequency response of the notch filters introduced in the HSA servo loops in block 112. It is known, for example, that a notch filter will introduce lag into a servo loop, thereby making the servo loop more unstable. This lag may be compensated for by the addition of lead into the servo loop by the servo compensator 110, typically by increasing the differential gain relative to the integral gain of the PID controller.

Tuning of the servo compensator 110 may be accomplished in several ways. One approach involves testing the dynamics of each HSA servo loop subject to the tuning operation by performing a seek/overshoot test. The amount of head overshoot for a particular HSA assembly may be determined when performing a short seek operation, such as from cylinder 500 to cylinder 510, in response to a step function. Depending on the overshoot and settling characteristics, the integral and/or derivative PID control components of the servo compensator 110 may be adjusted to either increase or decrease the amount of lag or lead in a given HSA servo loop. With reference to Equation [4] above, the derivative PID control component is given by the term $T_d$, and the integral PID control component is given by the term $T_i$.

Another short seek operation may be performed, and the lag/lead characteristics of the HSA servo loop may be reevaluated. This process may be repeated until the overshoot and settling characteristics of a given HSA servo loop is achieved. The seek/overshoot test may be performed for each HSA servo loop in which a digital notch filter is operative.

The digital notch filter or filters employed in block 112 are also dependent on the sampling rate, $f_s$. For example, if the notch filter employed in a given application is implemented as a $2^{nd}$ order Butterworth notch filter, the transfer function, $G_n(z)$, for this filter would be given as:

$$G_n(z) = \frac{b_0 + b_1 z^{-1} + b_2 z^{-2}}{1 + a_1 z^{-1} + a_2 z^{-2}} \quad [5]$$

In this case, the coefficients $b_0$, $b_2$, may be determined by using a Matched-z transform as follows:

$$b_0 = b_2 = \frac{1 - 2e^{-\Delta\Omega/(2f_s)}\cos(Q_1/f_s) + e^{-\Delta\Omega/(2f_s)}}{2(1 - \cos(Q_0/f_s))} \quad [6a]$$

where, $$Q_0 = 2\pi\sqrt{\hat{F}_1 \cdot \hat{F}_2} \quad [6b]$$

$$\Delta\Omega = 2\pi(\hat{F}_2 - \hat{F}_1) = 4\pi\Delta f \quad [6c]$$

$$Q_1 = \sqrt{Q_0^2 - \Delta\Omega^2/4} \quad [6d]$$

The estimated notch filter edge frequencies, $F_1$ and $F_2$, are given by $F_1 = f_r - \Delta f$ and $F_2 = f_r + \Delta f$, where $2\Delta f$ is the desired $-3$ dB notch width. Analysis of Equation [5] above demonstrates a very linear, positive relationship, Q, in the variation of the coefficients $b_0$, $b_2$ for small changes (e.g., $\pm 5\%$) in the sampling rate, $f_s$. The same is true for the other coefficients in Equation [5]. This implies that the notch filter coefficients, $b_j$, $a_j$, may be estimated for a small change in the sampling rate, $f_s$, by the simple linear formula given by $[b_j = Q(b_j) \cdot f_s]$. Accordingly, use of Equation [6a] given above may not be necessary, nor is the use of the other involved equations to determine the filter coefficients. The same linearity for small changes in the sampling rate, $f_s$, may be found for the PID compensation coefficients given in Equation [4].

Figure 6A:
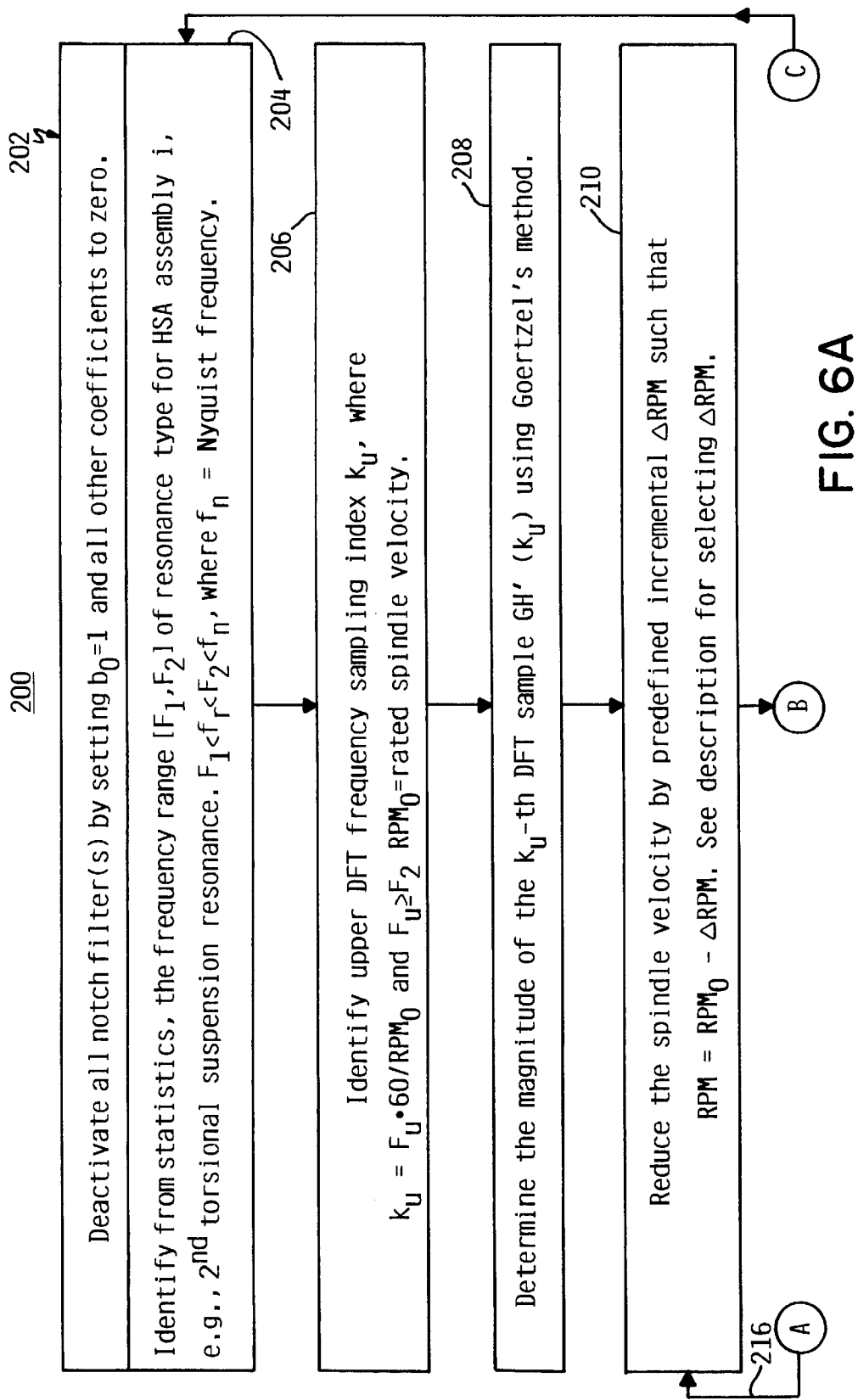
FIG. 6 is an illustration of a process-flow diagram for implementing the in-situ adaptive computing algorithm shown in block 122 of FIG. 5 for purposes of identifying resonance frequencies in one or more HSA assemblies provided in a disk drive system.
Figure 6B:
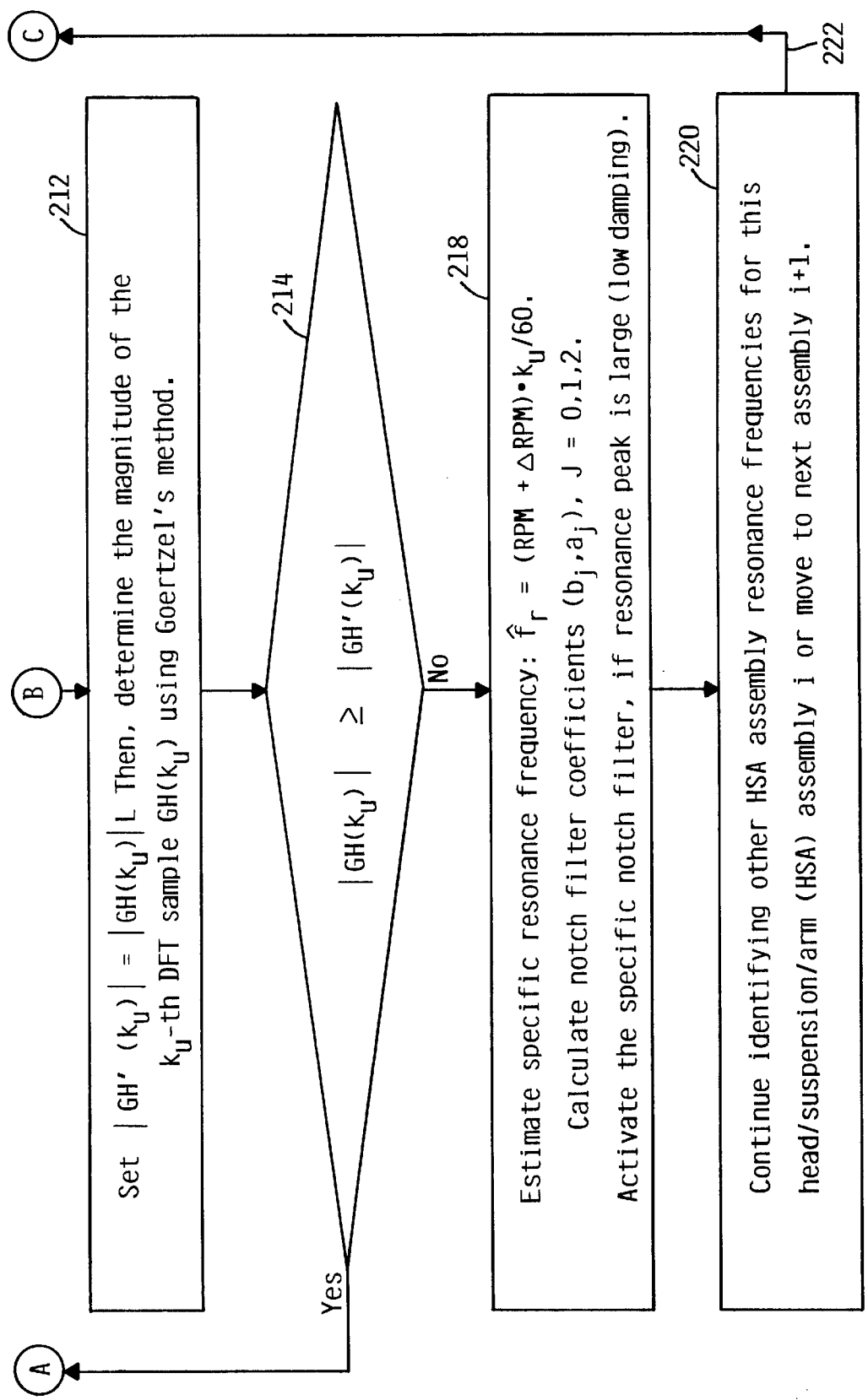

Referring now to FIG. 6, there is illustrated a process-flow diagram 200 for implementing the in-situ adaptive computing algorithm shown in block 122 of FIG. 5 for purposes of identifying resonance frequencies in one or more HSA assemblies provided in a disk drive system. As previously mentioned, all digital notch filters 112 are deactivated before the resonance frequency estimation process is initiated for a given HSAI. All notch filters are deactivated 202 by setting notch filter coefficient $b_0=1$ and all other coefficients to zero in Equation [5] given above. It is assumed that a frequency range $[F_1, F_2]$ of resonance typical for the i-th HSA assembly is known, such as through use of statistical analyses of test data obtained from a specific disk drive system during manufacturing, development, or screening.

For example, a particular HSAI assembly may have a second torsional suspension resonance, $f_r$, characterized in the following manner:

$$F_1 < f_r < F_2 < f_n$$

where, $f_n$ equals the Nyquist frequency. The Nyquist frequency is understood to represent a frequency of one-half the sampling frequency. of particular interest is the 3-sigma statistical frequency range $[F_1, F_2]$ of problematic HSA assembly resonances. To preclude aliasing problems, it is typically required that $F_1 < f_r < F_2 < f_n$, where $f_n$ represents the Nyquist frequency.

The Discrete Fourier Transform (DFT) frequency sampling index, $k_u$, where $k_u < N/2$, is determined 206 as follows:

$$k_u = F_u \cdot 60 / RPM_0 \quad [7]$$

$$F_u \leq F_2 \quad [8]$$

where, $F_u$ represents the first DFT index frequency that exceeds or equals $F_2$, and $RPM_0$ represents the rated spindle frequency, such as 7,200 RPM, for example. The magnitude of the DFT sample, $GH_0(k_u)$, which represents the open-loop compensated transfer function of the actuator servo, is then computed 208. It is noted that computing the magnitude of the $k_u$-th DFT sample, $GH'(k_u)$, may be determined using Goertzel's method.

The spindle velocity, $RPM_0$, is reduced 210 slightly by an amount $\Delta RPM$ to provide a new lower spindle velocity given as $RPM = RPM_0 - \Delta RPM$. It will be appreciated that there are many methods for selecting $\Delta RPM$. Methods such as "divide-and-conquer" may be used. A relatively simplistic approach involves holding $\Delta RPM$ fixed at a velocity that corresponds to a change in $F_u$ by 10 Hz, for example. This would imply that $\Delta RPM = 10 \cdot 60 / k_u$. In the case in which $k_u = 35$, for example, as was described previously with respect to FIGS. 3 and 4, $\Delta RPM$ is computed to be approximately 17. Since the frequency resolution for 7,200 RPM is 120 Hz, then twelve increments of spindle velocity change of 17 RPM each would span the frequency resolution space of 120 Hz. In this illustrative example, the incremental spindle velocity change, $\Delta RPM$, effectively increases the frequency resolution by a factor of twelve.

The previous magnitude of the compensated open-loop transfer function, $GH'(k_u)$, determined at step 208, is used to compute 212 the magnitude of $GH(k_u)$ at the reduced spindle velocity, RPM. Once again, the Goertzel method may be employed to perform this computation. A comparison between $|GH(k_u)|$ and $|GH'(k_u)|$ is then performed 214. If $|GH(k_u)|$ is determined to be greater than or equal to $|GH'(k_u)|$, the spindle velocity is reduced by an additional increment, $\Delta RPM$, and the previously determined value of $|GH(k_u)|$ is stored as $|GH'(k_u)|$. The new magnitude of $|GH(k_u)|$ is then recomputed 212. The comparison in decision block 214 is repeated until the inequality is not satisfied.

If $|GH(k_u)|$ is determined to be less than $|GH'(k_u)|$, the specific resonance frequency, $f_r$, is estimated 218 using Equation [3] given above. Once the specific HSA assembly resonance frequency, $f_r$, is estimated 218, the corresponding notch filter coefficients $[b_j, a_j]$, where $j=0, 1, 2$, may then be computed 218. If the specific resonance peak is considered to be large, i.e., low damping ratio, then the corresponding notch filter is activated in the servo loop. Observation of a large amount of damping of a specific HSA assembly resonance would typically make it unnecessary to invoke the corresponding notch filter.

Other HSA assembly resonance frequencies associated with the i-th HSA assembly may then be identified 220 in a manner previously described, or the next HSA assembly, i-th+1, may be subject to process-flow steps 204–220. When all problematic resonances in a specific HSA assembly have been addressed, the process will proceed to the next HSA assembly in the disk drive system.

Figure 7:
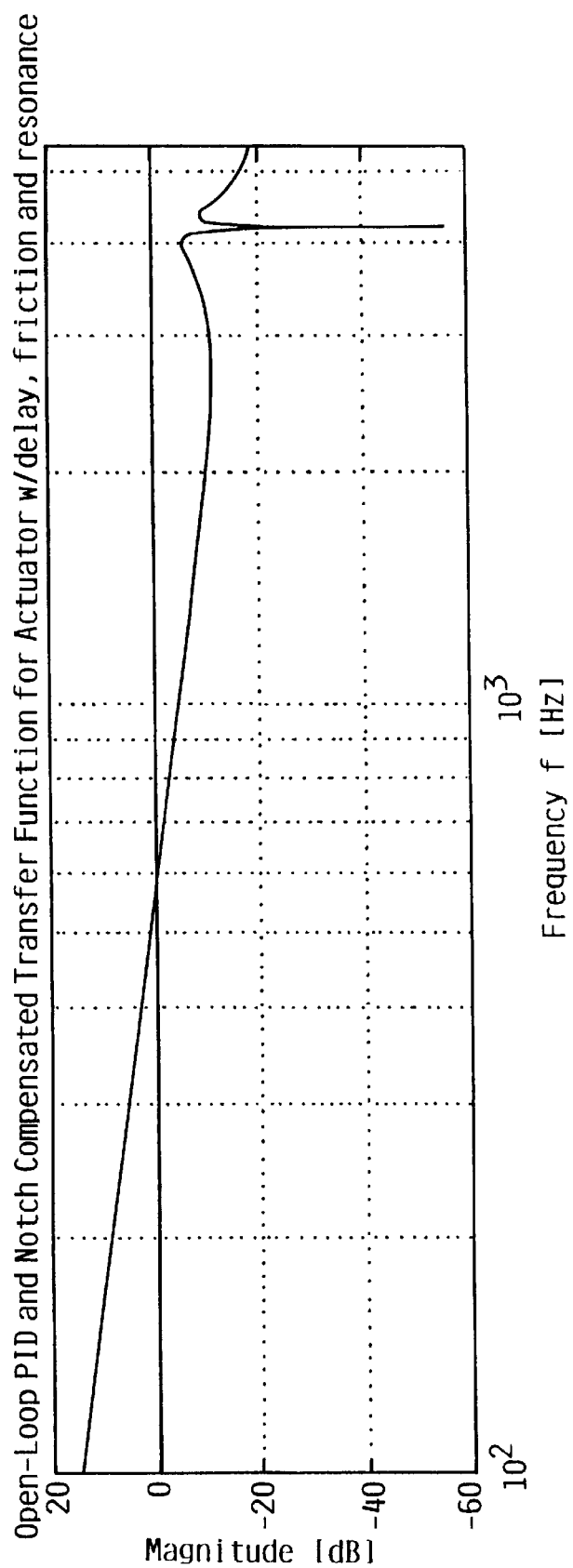
FIG. 7 depicts a simulated PID and notch compensated disk drive system actuator open-loop transfer function according to an embodiment of the present invention.

FIG. 7 illustrates the introduction of a properly tuned notch filter with a −3 dB width of 400 Hz for the 4,140 Hz HSA assembly resonance shown in FIGS. 3 and 4. It is noted that FIG. 7 depicts a simulated PID and notch compensated disk drive system actuator open-loop transfer function with a suspension resonance frequency at 4,140 Hz and a damping ratio of 0.02. The Butterworth notch has a center frequency of 4,140 Hz and a −3 dB width of 600 Hz. The dots illustrate the location of the DFT frequency samples obtained from the position error signal of the disk drive system employing data storage disks having 90 servo samples per revolution and spinning at 7,200 RPM.

In an in-situ implementation, it is desirable that statistics about all significant HSA assembly resonances identified in the disk drive system be stored for future reference. Historic records of parameters, such as the estimated resonance damping ratio, $\delta$, is stored with the estimated natural resonance frequency, $f_r$, for predictive failure analysis purposes. For example, a large change in the damping ratio and resonance frequency for a particular HSA assembly may suggest a loose swage joint. A loose swage joint can lead to a catastrophic disk crash event.

It has been determined that making slight adjustments to the spindle velocity in a manner consistent with the principles of the present invention yields practically infinite frequency resolution in the DFT samples. This is very important for the proper identification of HSA assembly resonances in a disk drive system. It will be appreciated by those skilled in the art that precisely identifying bothersome mechanical HSA assembly resonances in a disk drive system is generally not achievable if the disk spindle is rotated at a fixed speed when only a limited number of servo sectors, N, are available. Use of Goertzel's DFT algorithm makes it more practical to use the servo processor when performing individual in-situ notch tuning operations. The computational load required by Goertzel's algorithm is much less than that required by FFT approaches, and requires much less RAM and ROM.

Currently, precise tuning of notch filters is not achievable using conventional techniques if the disk spindle is rotated at a constant speed. Using conventional methods, the resonance frequency of an HSA assembly can only be estimated within a tolerance of ±RPM/60. This would imply that the corresponding notch tuning would be off-centered. As spindle speeds increase for a fixed number of servo sectors, the frequency resolution is further reduced. Future high performance disk drive systems will likely spin at 10,000 RPM or higher with fewer number of servo sectors employed. Thus, the DFT frequency resolution problem will become more pronounced as spindle speeds increase.

Implementing an adaptive filtering methodology in accordance with the principles of the present invention may be used to remedy bothersome mechanical HSA assembly resonance problems in current and future disk drive systems with a high degree of effectiveness. Individual in-situ tuning of each HSA assembly resonance may be effected to track changes in torsional and bending mode frequencies and damping that vary with time and temperature.

It is noted that some mechanical HSA assembly structures may have better manufacturing tolerances than others. Such well-behaved structures will thus become less excited in the servo loop. They may require fewer or no compensating notch filters. In such cases, it would appear unnecessary to notch-compensate such well-behaved HSA assemblies. Only those HSA assemblies that require notch-compensation should be fitted with properly tuned notch filters. The decision when to or not to notch-compensate may be made in-situ a disk drive system. An HSA which initially does not require any notch compensation may, over time, require such notch-compensation later in its operating life. It should be noted that, with reference to FIG. 5, the digital servo processor 110 is tuned as a function of the digital notch filters introduced in block 112 for each HSA.

In general, using notch filters on an as-needed basis provides for an overall improvement in the gain margin and phase margin for individual HSA servo loops that do not require resonance notching. This implies that an overall improvement in disk drive system access and track following performance may be realized. Data that requires fast access may be dynamically moved with HSA assemblies that do not require notch-compensation or have better phase margin and gain margin properties than other HSA assemblies.

Individual in-situ notch filter tuning, along with the use of historic records of resonance frequencies and corresponding damping ratios, provides for the efficient assessment of the overall health of an HSA assembly. Large changes in one or both parameters may be indicative of a structural defect or irregularity, such as a loose swage joint, a damaged suspension, or excessive accumulation of debris on the head slider. As such, the principles of the present invention may be applied for purposes of performing in-situ predictive failure analysis.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of identifying a resonance frequency of a support structure supporting a read/write head in proximity with a data storage medium, comprising:

producing a frequency transform of a position error signal obtained using servo information provided on the data storage medium;

obtaining a particular sample of the frequency transform;

computing a magnitude of the particular sample;

varying a velocity of the data storage medium by varying a spindle velocity to a plurality of velocities and repeating the producing, obtaining, and computing operations at each of the velocities; and calculating a resonance frequency of the support structure using the velocity associated with the particular sample having a maximum magnitude.

2. The method of claim 1, wherein:

obtaining the particular sample comprises obtaining a sample of the frequency transform representative of a frequency higher than the resonance frequency of the support structure; and varying the velocity comprises reducing the velocity of the data storage medium.

3. The method of claim 1, wherein:

obtaining the particular sample comprises obtaining a sample of the frequency transform representative of a frequency lower than the resonance frequency of the support structure; and varying the velocity comprises increasing the velocity of the data storage medium.

4. The method of claim 1, wherein producing the frequency transform of the position error signal comprises producing the frequency transform using a Discrete Fourier Transform (DFT), a Fast Fourier Transform (FFT), a Short-Time Discrete Fourier Transform (STFT), or a wavelet transform of the position error signal.

5. The method of claim 1, wherein producing the frequency transform of the position error signal comprises producing the frequency transform using a Discrete Fourier Transform (DFT), and the magnitude of the particular samples is computed using Goertzel's algorithm.

6. The method of claim 1, wherein producing the frequency transform of the position error signal comprises producing the frequency transform using a Discrete Fourier Transform (DFT), and obtaining the particular sample comprises obtaining a DFT sample using a DFT sampling index, $k_u$, characterized by:

$$k_u = F_u \cdot 60 / RPM_0$$

where, $F_u$ represents a first DFT index frequency that exceeds or equals an upper frequency of a range of expected support structure resonance frequencies, and $RPM_0$ represents a rated data storage medium frequency given in RPM.

7. The method of claim 1, further comprising computing one or more filter coefficients using a sampling rate associated with the velocity at which the particular sample having the maximum magnitude is calculated.

8. The method of claim 1, further comprising substantially canceling an effect of the resonance frequency of the support structure in the position error signal.

9. The method of claim 1, wherein resonance frequency identification method is performed for each of a plurality of resonance frequencies associated with the support structure.

10. The method of claim 1, wherein resonance frequency identification method is performed for each of a plurality of read/write heads provided on each of a plurality of support structures.

11. An apparatus, comprising:

a data storage medium movable by varying a spindle velocity a plurality of velocities;

a support structure supporting a transducer in proximity with the data storage medium, the transducer obtaining an information signal from the data storage medium; and a processor that obtains a position error signal (PES) using the information signal, the processor computing a magnitude of a particular sample of a PES frequency transform at each of a plurality of data storage medium velocities and calculating a resonance frequency of the support structure using the data storage medium velocity associated with the particular sample having a maximum magnitude.

12. The apparatus of claim 11, further comprising a programmable filter, coupled to the processor, that receives the position error signal, the processor programming the filter to substantially cancel an effect of the resonance frequency associated with the support structure in the position error signal.

13. The apparatus of claim 12, wherein the processor programs the filter by computing one or more filter coefficients using a sampling rate associated with the data storage medium velocity at which the particular sample having the maximum magnitude is calculated.

14. The apparatus of claim 11, wherein the processor programs the filter to cancel an effect of each of a plurality of resonance frequencies associated with the support structure in the position error signal.

15. The apparatus of claim 11, wherein the processor programs the filter to cancel in the position error signal an effect of the resonance frequency for the support structure supporting each of a plurality of transducers.

16. The apparatus of claim 11, wherein the processor computes the magnitude of the particular sample by obtaining a PES frequency transform sample representative of a frequency higher than the resonance frequency of the support structure, and produces velocity control signals for reducing the velocity of the data storage medium.

17. The apparatus of claim 11, wherein the processor computes the magnitude of the particular sample by obtaining a PES frequency transform sample representative of a frequency lower than the resonance frequency of the support structure, and produces velocity control signals for increasing the velocity of the data storage medium.

18. The apparatus of claim 11, wherein the processor computes the PES frequency transform using a Discrete Fourier Transform (DFT), a Fast Fourier Transform (FFT), a Short-Time Discrete Fourier Transform (STFT), or a wavelet transform of the position error signal.

19. The apparatus of claim 11, wherein the processor computes the PES frequency transform using a Discrete Fourier Transform (DFT), and the particular sample is computed using Goertzel's algorithm.

20. An apparatus, comprising:
a data storage medium;
a plurality of transducers each supported by a support structure in proximity with the data storage medium and defined within a respective servo loop and associated spindle velocity, a position error signal produced within each of the servo loops;
one or more programmable filters provided within each of the servo loops; and
a processor that programs selected ones of the programmable filters to substantially cancel an effect of a resonance frequency associated with the support structure in the respective position error signals.

21. The apparatus of claim 20, wherein the plurality of transducers are supported by a plurality of support structures, and the processor programs selected ones of the programmable filters to substantially cancel an effect of a resonance frequency associated with each of the support structures in the respective position error signals.

22. The apparatus of claim 20, wherein each of the selected programmable filters adds lag into its respective servo loop, and the processor adjusts to compensate for the additional lag in the respective the servo loops.

23. The apparatus of claim 22, wherein the processor adjusts to compensate for the additional lag by introducing lead into the respective servo loops.

24. The apparatus of claim 20, wherein the processor comprises a Proportional-Integral-Differential (PID) controller.

25. The apparatus of claim 20, wherein the programmable filters comprise programmable notch filters or programmable elliptic filters.

26. A data storing system, comprising:
a data storage disk;
a plurality of transducers each supported by a support structure in proximity with the disk and defined within a respective servo loop and associated spindle velocity, a position error signal produced within each of the servo loops;
an actuator that provides relative movement between the transducers and the disk;
one or more programmable filters provided within each of the servo loops; and
a processor that programs selected ones of the programmable filters to substantially cancel an effect of a resonance frequency associated with the support structure in the respective position error signals.

27. The system of claim 26, wherein the plurality of transducers are supported by a plurality of support structures, and processor programs selected ones of the programmable filters to substantially cancel an effect of a resonance frequency associated with each of the support structures in the respective position error signals.

28. The system of claim 26, wherein each of the selected programmable filters adds lag into its respective servo loop, and the processor adjusts to compensate for the additional lag in the respective servo loops.

29. The system of claim 28, wherein the processor adjusts to compensate for the additional lag by adding lead into the respective servo loops.

30. The system of claim 26, wherein the programmable filters comprise programmable notch filters or programmable elliptic filters.

* * * * *

UNITED STATES PATENT AND TRADEMARK OFFICE
CERTIFICATE OF CORRECTION

PATENT NO.   : 6,417,982 B1
DATED        : July 9, 2002
INVENTOR(S)  : Hal Hjalmar Ottesen and Gordon James Smith It is certified that error appears in the above-identified patent and that said Letters Patent is hereby corrected as shown below:

Column 13,
Line 43, after "storage medium" insert -- by varying a spindle velocity --.
Line 46, after "storage medium" insert -- by varying a spindle velocity --.

Signed and Sealed this

Twenty-fifth Day of February, 2003

JAMES E. ROGAN
*Director of the United States Patent and Trademark Office*